N. PALMER.
Rotary-Moldboard Plow.
No. 211,638. Patented Jan. 28, 1879.
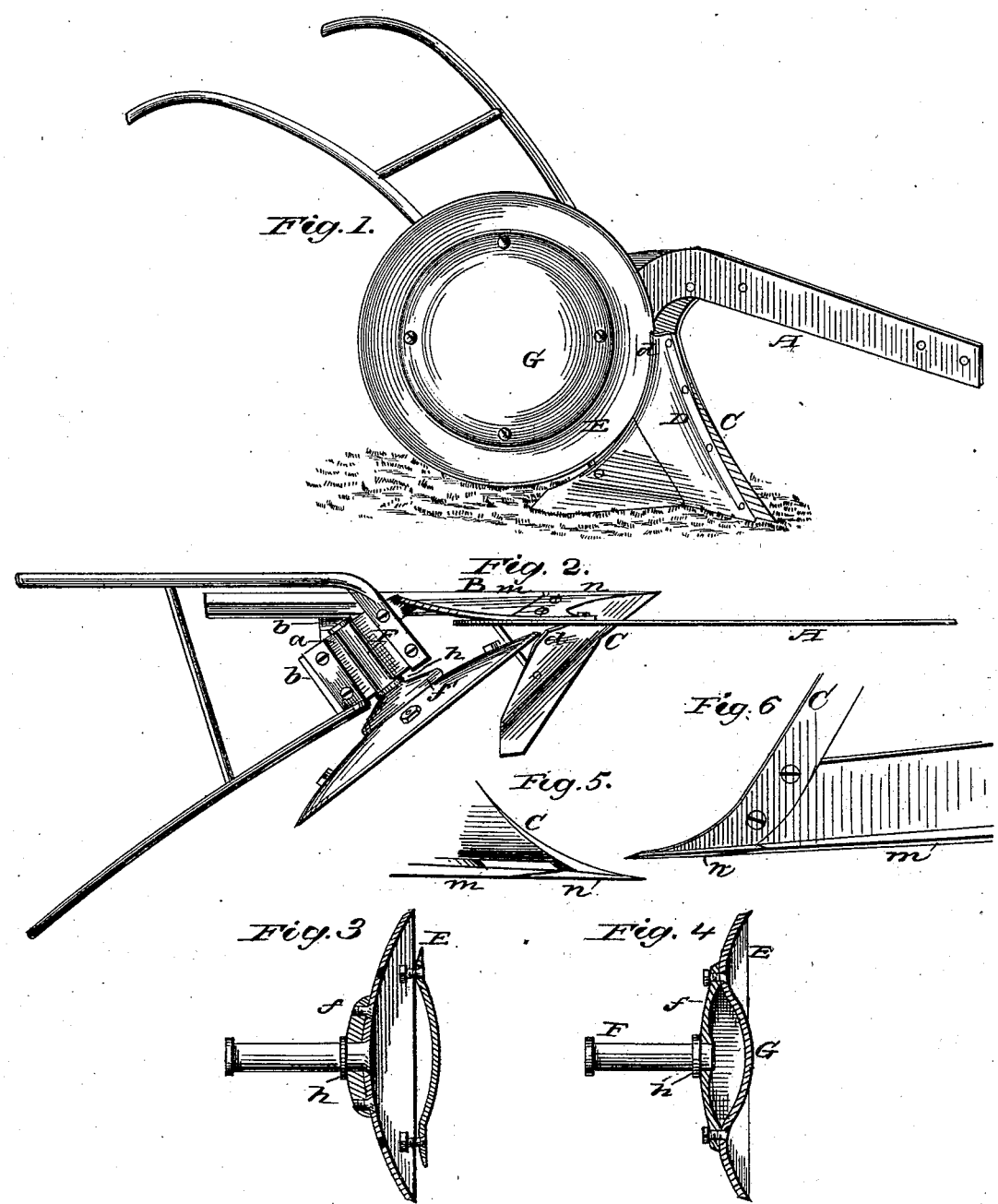

UNITED STATES PATENT OFFICE.

NELSON PALMER, OF NEW YORK, N. Y.

IMPROVEMENT IN ROTARY MOLD-BOARD PLOWS.

Specification forming part of Letters Patent No. 211,638, dated January 28, 1879; application filed December 13, 1878.

*To all whom it may concern:*

Be it known that I, NELSON PALMER, of the city of New York, county and State of New York, have invented certain new and useful Improvements in Rotary Mold-Board Plows; and I do hereby declare the following to be a full, clear, and exact description of the same, reference being made to the accompanying drawings, forming a part of this specification, and in which—

Figure 1 is a perspective view. Fig. 2 is a top-plan view. Fig. 3 is a vertical section of the disk mold-board; Fig. 4, a vertical section of the disk mold-board and convex center formed in one piece. Figs. 5 and 6 are detail views.

This invention relates to improvements in the class of rotary mold-board plows or cultivators employing a concave disk for the mold-board. Heretofore in the use of the concave disk mold-board, which is arranged obliquely to the line of draft, the soil turned up by the plowshare strikes or is thrown directly against the face of the disk, so that the greatest pressure is below and in rear of the center of said disk, in consequence of which great strain, and consequently great friction, are liable to be brought on the revolving axle of the disk, thus increasing the draft of the plow. To obviate this defect, and gain other great advantages, whereby the furrow can be turned over at any angle, from the vertical to the horizontal, without increasing or in any way interfering with the draft of the plow, is the object of my present invention; and to this end the invention consists in the combination, in a machine or implement for turning the soil, of a concave disk or mold-board, with a convex center formed with or removably secured upon the concave face of said disk; and the invention also consists in the combination, with the land-side, plowshare, and revolving disk or mold-board, of a novel construction of colter, arranged relatively to said parts, whereby the plow is adapted to enter the ground more readily, and held more steadily in the ground, and also protecting and preventing the mold-board or disk from clogging, all as will be hereinafter fully described.

To enable others skilled in the art to make and use my invention, I will now proceed to describe the exact manner in which it is carried out.

In the drawings, A represents the plow-beam, curved at its rear end, and bolted to the land-side B within the acute angle formed by the junction of the land-side and plowshare C, said land-side extending backward, and forming a support for the journal or bearing of the revolving axle of the disk mold-board. The front edges of the land-side and plow-share are thinned and beveled from the bottom upward and backward at an angle of about forty-five degrees. In front of and resting against these edges is a colter-share, D, of steel, secured to the land-side and plow-share, and extending upwardly, and curving as it approaches the plow-beam, to which it is also secured, said colter-share cutting the furrow-slice, and also forming a rigid support for the beam.

The colter D is provided at the bottom with side cutting-flanges $n$ $n'$, which fit over and form forward continuations of the side cutting-flanges $m$ $m'$ of the plowshare and land-side, all as clearly shown in Figs. 5 and 6, thus forming continuous cutting-edges from the extreme forward point of the colter to the rear ends of the plowshare and land-side, said cutting-flanges causing the plow to enter the ground or soil more readily, and holding and keeping the plow more steadily while in operation.

The colter is also provided with a rearwardly-projecting angular flange, $d$, extending some distance above the plowshare, as shown in Fig. 1, for protecting and preventing the soil from choking or clogging the revolving disk mold-board E, arranged in rear of the plow-share.

Near the rear end of the land-side is arranged a metal box, $a$, resting upon a suitable support or supports, $b$, in which a shaft, F, plays or turns, and to one end of which the rear side of the concave disk mold-board E is secured by means of the annular flange $f$. This concave disk mold-board is beveled from the convex to the concave side, making the concave edge sharp, to adapt it in its compound rotary and forward motion, to cut roots or like obstacles that may come in its way.

The concave disk mold-board is arranged obliquely to the line of draft, and its front face is provided with a convex center, G, formed with the disk, as shown in Fig. 4, or removably secured thereto, as shown in Figs. 1 and 3.

By this convex center the pressure of the soil turned by the plowshare comes more directly against the center of the disk mold-board on a line with its shaft, thus equalizing the pressure of the soil thereon, thereby greatly decreasing the draft of the plow, while by making the center of the convex more prominent, or to protrude outward farther, the furrow can be turned more from a vertical to a horizontal, according to the prominence given said center, and also allowing the disk mold-board to enter the ground to nearly one-half its diameter. A steel washer, $h$, is arranged between the journal-box of the shaft and the flange $f$ of the disk mold-board, which greatly diminishes the friction, prevents the wearing of the parts, and lightens the draft. These plows may be used in gangs, either with handles or mounted on wheels.

Further description of the operation of my improved plow is deemed unnecessary, it being obvious from the foregoing description.

Having thus fully described my invention, what I claim as new, and desire to secure by Letters Patent, is—

1. In a machine or implement for turning the soil, the concave disk or mold-board E, provided with a convex center, G, upon its front or concave face, substantially as and for the purpose herein shown and described.

2. The combination, with a concave disk or mold-board, E, of a removable convex center, G, substantially as and for the purpose herein shown and described.

3. The combination, with the revolving disk or mold-board and the plowshare and landside provided with the bottom cutting-flanges $m$ $m'$, of the colter D, provided with the rearwardly-projecting angular flange $d$, and bottom cutting-flanges $n$ $n'$, forming forward continuations of the cutting-flanges $m$ $m'$, substantially as and for the purpose herein shown and described.

NELSON PALMER.

Witnesses:
DE WITT C. ALLEN,
H. J. ENNIS.